United States Patent
Ji et al.

(10) Patent No.: US 11,101,944 B2
(45) Date of Patent: Aug. 24, 2021

(54) METHOD AND DEVICE FOR TRANSMITTING INFORMATION BY USING SPARSE CODING

(71) Applicant: SEOUL NATIONAL UNIVERSITY R&DB FOUNDATION, Seoul (KR)

(72) Inventors: Hyoungju Ji, Seoul (KR); Byonghyo Shim, Seoul (KR); Sunho Park, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 27 days.

(21) Appl. No.: 16/605,798

(22) PCT Filed: Apr. 18, 2018

(86) PCT No.: PCT/KR2018/004490
§ 371 (c)(1),
(2) Date: Oct. 16, 2019

(87) PCT Pub. No.: WO2018/194365
PCT Pub. Date: Oct. 25, 2018

(65) Prior Publication Data
US 2020/0127779 A1    Apr. 23, 2020

(30) Foreign Application Priority Data

Apr. 18, 2017 (KR) .................. 10-2017-0049764
Apr. 10, 2018 (KR) .................. 10-2018-0041629

(51) Int. Cl.
    *H04L 5/00*    (2006.01)
(52) U.S. Cl.
    CPC .......... *H04L 5/0016* (2013.01); *H04L 5/0044* (2013.01)

(58) Field of Classification Search
    CPC ................. H04L 5/0016; H04L 5/0044; H04L 25/03898; H04L 1/0056; H04L 1/246; H04W 72/0466
    See application file for complete search history.

(56) References Cited

U.S. PATENT DOCUMENTS 9,166,663 B2    10/2015 Bayesteh et al.
9,240,853 B2     1/2016 Nikopour et al.
(Continued)

FOREIGN PATENT DOCUMENTS

KR    10-2015-0097603 A    8/2015
KR    10-2016-0052781 A    5/2016
(Continued)

OTHER PUBLICATIONS

PCT International Search Report, PCT/KR2018/004490, dated Jul. 26, 2018, 4 Pages.
(Continued)

*Primary Examiner* — Kibrom T Hailu
(74) *Attorney, Agent, or Firm* — Fenwick & West LLP

(57) ABSTRACT

A method by which a transmitting end operates in a wireless communication system comprises the steps of: performing sparse coding on information so as to have sparsity of which the number of non-zero symbols is K; configuring a codebook by including a code for spreading for each user; spreading the coded information by using one or more codes in the codebook; and transmitting a channel by overlapping the spread information. Therefore, even if the number of encoded symbols increases, the number of symbols actually having a value is very sparsely configured such that the complexity of a transmitter and a receiver does not increase, and thus restoration performance improves.

10 Claims, 14 Drawing Sheets

(56) References Cited

U.S. PATENT DOCUMENTS

| | | | |
|---|---|---|---|
| 10,608,780 B2* | 3/2020 | Angelopoulos | H04L 67/12 |
| 2014/0140360 A1 | 5/2014 | Nikopour et al. | |
| 2014/0169408 A1 | 6/2014 | Bayesteh et al. | |
| 2016/0028459 A1 | 1/2016 | Bayesteh et al. | |
| 2016/0049999 A1* | 2/2016 | Taherzadeh Boroujeni | H04J 13/10 370/335 |
| 2016/0072660 A1* | 3/2016 | Nikopour | H04B 7/0413 375/298 |
| 2016/0338040 A1* | 11/2016 | Lee | H04W 72/0413 |
| 2017/0019222 A1 | 1/2017 | Ge et al. | |
| 2017/0054483 A1* | 2/2017 | Taherzadeh Boroujeni | H04L 27/3444 |
| 2017/0064645 A1* | 3/2017 | Taherzadeh Boroujeni | H04W 52/286 |
| 2017/0127423 A1* | 5/2017 | Boroujeni | H04L 1/00 |

FOREIGN PATENT DOCUMENTS

| | | | |
|---|---|---|---|
| WO | WO 2014/075637 A1 | 5/2014 | |
| WO | WO 2014/090189 A1 | 6/2014 | |

OTHER PUBLICATIONS

Lee, H. N., et al., "Introduction of Compressive Sensing," The Journal of Korea Institute of Electronics Engineers, Jan. 2011, pp. 19-30, vol. 38, No. 1 (with English abstract).

* cited by examiner

METHOD AND DEVICE FOR TRANSMITTING INFORMATION BY USING SPARSE CODING

TECHNICAL FIELD

The present disclosure relates to information transmission technology, and more particularly, to an apparatus and method that use sparse coding and multi-code spreading, and a restoration receiver by compressed sensing to transmit information in ultra-reliable and low latency communication (URLLC).

EXPLANATION OF NATIONAL-SUPPORTED RESEARCH AND DEVELOPMENT

This research was supported by the MSIT (Ministry of Science and ICT), Korea, under the ITRC (Information Technology Research Center) support program (IITP-2019-2017-0-01637) supervised by the IITP (Institute for Information & communications Technology Promotion).

BACKGROUND ART

Recently, the growing attention is paid to high-reliable and low latency communication as a future technology for use in real time, virtual reality, autonomous infrastructure and factory automation infrastructure applications. This URLLC technology requires transmission with minimal transmission latency almost without transmission failure.

However, the existing data channel transmission methods rely on complex channel coding and channel decoding methods to prevent transmission failures. Accordingly, they are difficult to achieve low latency due to complex signal processing. Additionally, to determine if there is an error, cyclic redundancy check (CRC) is transmitted together with control information, and thus, this method uses too many resources for additional information for high reliability transmission. Moreover, for high reliability transmission, a low code rate of channel coding is required, and in this case, the length of the encoded symbol gradually increases as the code rate reduces.

Accordingly, improved reliability is ensured, while complexity required for the receiver to decode a received signal is proportional to the symbol length. Accordingly, decoding latency increases, and it is difficult to achieve low latency. That is, the existing channel coding schemes have a trade-off relationship between high reliability transmission and low latency transmission.

DISCLOSURE

Technical Problem

The present disclosure is directed to providing a sparse coding device that significantly reduces the code rate for high reliability transmission, while not increasing the computational complexity, and significantly increases the transmission success rate of a channel, an apparatus that spreads and transmits it using multiple codes, and an apparatus and method that receives it and restores a sparse signal.

Technical Solution

To achieve the above-described object, according to an aspect of the present disclosure, a method by which a transmitting end operates in a wireless communication system includes performing sparse coding on information so as to have sparsity of which the number of non-zero symbols is K, configuring a codebook by including a code for spreading for each user, spreading the coded information by using one or more codes in the codebook, and transmitting a channel by overlapping the spread information.

According to an embodiment of the present disclosure, the performing sparse coding on the information may include performing sparse coding by an integer mapping method that carries out one-to-one correspondence between an integer value and the information, wherein the integer value is representable through position information in which a non-zero symbol of a symbol size N and sparsity K is positioned.

According to an embodiment of the present disclosure, the performing sparse coding on the information may include performing sparse coding by a structured mapping method that configures the same number of non-zero symbols in columns and rows of a matrix corresponding to the information through a symbol size N and sparsity K.

According to an embodiment of the present disclosure, the performing sparse coding on the information may include performing sparse coding by a table mapping method that pre-configures the position of the non-zero symbol according to an information field corresponding to each information.

According to an embodiment of the present disclosure, the spreading may include spreading the coded information by using one or more codes having a non-orthogonal property in the codebook.

According to an embodiment of the present disclosure, the method by which a transmitting end operates may further include allocating a resource according to the information, and transmitting a data channel through the allocated resource.

According to an aspect of the present disclosure, a method by which a receiving end operates in a wireless communication system includes acquiring a codebook configured including a code for spreading for each user, receiving a channel including sparse coded information, and identifying the information from the received channel based on the codebook.

According to an embodiment of the present disclosure, the identifying the information may include identifying one or more codes used for a transmitting end to spread the received channel using the codebook, and restoring the sparse coded information from the received channel using a compressed sensing scheme based on the one or more codes.

According to an embodiment of the present disclosure, the identifying the information may include identifying the information by performing a reverse process of sparse coding on the sparse coded information.

According to an embodiment of the present disclosure, the method by which a receiving end operates may further include receiving a data channel based on the information.

According to still another aspect of the present disclosure, an apparatus for transmitting signals in a wireless communication system includes at least one processor which performs sparse coding on information so as to have sparsity of which the number of non-zero symbols is K, configures a codebook by including a code for spreading for each user, and spreads the coded information by using one or more codes in the codebook, and a transceiver which transmits a channel by overlapping the spread information.

According to an embodiment of the present disclosure, the at least one processor may perform sparse coding by an integer mapping method that carries out one-to-one correspondence between an integer value and the information, wherein the integer value is representable through position information in which a non-zero symbol of a symbol size N and sparsity K is positioned.

According to an embodiment of the present disclosure, the at least one processor may perform sparse coding by a structured mapping method that configures the same number of non-zero symbols in columns and rows of a matrix corresponding to the information through a symbol size N and sparsity K.

According to an embodiment of the present disclosure, the at least one processor may perform sparse coding by a table mapping method that pre-configures the position of the non-zero symbol according to an information field corresponding to each information.

According to an embodiment of the present disclosure, the at least one processor may spread the coded information by using one or more codes having a non-orthogonal property in the codebook.

According to an embodiment of the present disclosure, the at least one processor may allocate a resource according to the information, and the transceiver may transmit a data channel through the allocated resource.

Advantageous Effects

As opposed to the related art having the increasing complexity of transmitter and receiver with the increasing number of encoded symbols, in the present disclosure, even if the number of encoded symbols increases, the number of symbols actually having a value is very sparsely configured such that the complexity of transmitter and receiver does not increase.

Additionally, the present disclosure does not send information to each symbol to transmit, and maps different information to different positions using the position of a non-zero symbol among symbols being transmitted and transmits them, and thus the present disclosure uses an information transmission method that is different from previous ones. Through this, high reception performance is obtained, and high reliability transmission is achieved.

In addition, the present disclosure does not send user information together with control information, and configures a spreading codebook differently for each user, thereby notably reducing the total amount of control information, and reducing an amount of resources necessary for control channel transmission.

Accordingly, it is possible to implement high-reliable and low latency communication by achieving high reliability transmission and reducing transmission latency through the proposed technology.

MODE FOR INVENTION

Figure 1:
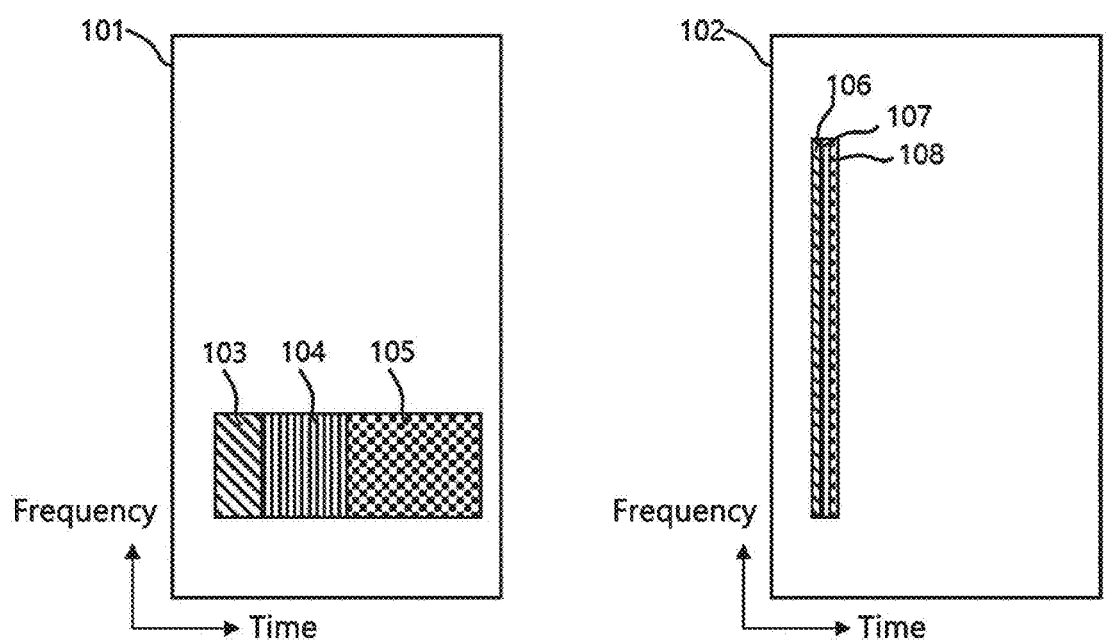
FIG. 1 shows an example of data channel configuration of a downlink ultra-reliable and low latency communication (URLLC) system to which the present disclosure is applied.

The advantages and features of the present disclosure and the methods for achieving the same will be apparent from the embodiments described below in detail with reference to the accompanying drawings. However, the present disclosure is not limited to the embodiments disclosed below and will be embodied in a variety of different forms, these embodiments are provided so that the present disclosure will be thorough and complete and will fully convey the scope of the present disclosure to those skilled in the art, and the present disclosure is defined by the scope of the appended claims. Throughout the specification, like reference signs denote like elements.

In describing the embodiments of the present disclosure, a certain detailed description of known functions or elements is determined to render the key subject matter of the present disclosure unnecessarily ambiguous, the detailed description will be omitted herein, and the terms as used herein are defined taking into account the functions in the embodiments of the present disclosure and may be changed depending on the intent of the user or operator or the convention. Accordingly, the definition should be made based on the context throughout the specification.

Combinations of each block of a block diagram and each step of a flowchart attached hereto may be performed by computer program instructions (execution engine), and these computer program instructions may be mounted on a processor of a universal computer, a special computer or other programmable data processing device, and thus the instructions executed through the processor of the computer or other programmable data processing device generate a means for performing the functions described in each block of the block diagram or each step of the flowchart.

The computer program instructions may be stored in a computer-enabled or computer-readable memory for the computer or other programmable data processing device to implement the functions by a specific method, and thus the instructions stored in the computer-enabled or computer-readable memory may produce a production item containing the instruction means for performing the functions described in each block of the block diagram or each step of the flowchart.

Additionally, the computer program instructions may be mounted on the computer or other programmable data processing device, and thus the instructions that enable the computer or other programmable data processing device by performing a series of operation steps on the computer or other programmable data processing device to generate a process executable by the computer may provide the steps for performing the functions descried in each block of the block diagram and each step of the flowchart.

Additionally, each block or each step may represent part of a module, a segment or a code including at least one executable instructions for performing specific logical functions, and it should be noted that in some alternative embodiments, the functions mentioned in blocks or steps may take place out of order. For example, two blocks or steps shown in succession may be, in fact, performed substantially concurrently, and the blocks or steps may be performed in a reverse order of the corresponding functions if necessary.

Hereinafter, an embodiment of a transmitting end and a receiving end that transmit and receive a control channel using sparse coding in a wireless communication system will be described in detail with reference to the accompanying drawings. The specification is described by taking a base station as an example of the transmitting end (an apparatus for transmitting signals) and a terminal as an example of the receiving end (an apparatus for receiving signals). However, the embodiments of the present disclosure disclosed below may be modified in many other forms, and the scope of the present disclosure is not limited to the embodiments described below. Additionally, although the specification describes control channel transmission as an embodiment, the present disclosure is not limited thereto, and may be generally applied to channel configuration for small-sized information to transmit. The embodiments of the present disclosure are provided to help those having ordinary skill in the art to understand the present disclosure fully and completely.

FIG. 1 shows an example of data channel configuration of a downlink ultra-reliable and low latency communication (URLLC) system to which the present disclosure is applied.

In FIG. 1, a graph 101 shows a data channel transmission method according to the related art, and a graph 102 shows a data transmission method for URLLC. The data channel transmission method according to the related art transmits a pilot 103, a control channel 104 and a data channel 105 in that order in terms of time and frequency, they are mapped to two-dimensional resources of time and frequency and then transmitted, and this is allocated based on channel information of a user.

In contrast, URLLC requires a very short transmission time, and thus a pilot 106, a control channel 107 and a data channel 108 are transmitted with a very long structure in the frequency axis, and transmission is performed using a very short time in the time axis. That is, a channel may be configured for transmission during a short time using a broad frequency resource.

Figure 2:
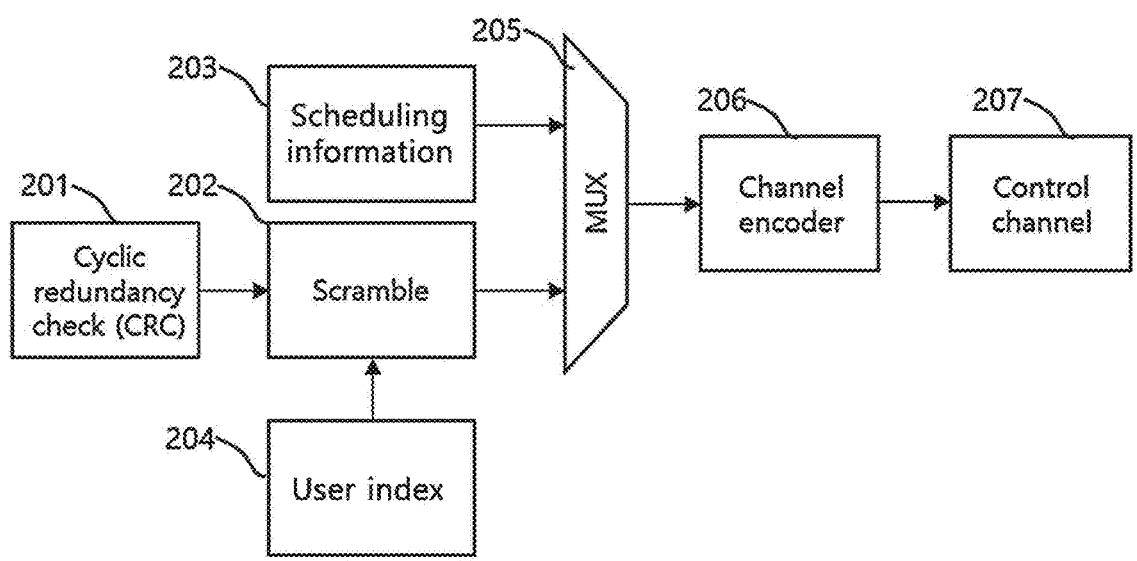
FIG. 2 is a diagram showing a control channel transmission process according to the related art.

FIG. 2 is a diagram showing a control channel transmission process according to the related art. In a data transmission signal, a control channel signal includes information for decoding a data channel, and a method for control channel transmission according to the related art is as follows.

First, scheduling information (control information or scheduling information) 203 is transmitted together with a cyclic redundancy check (CRC) 201 for determining if there is an error, and the CRC 201 is generally scrambled with a user index value 204 through a scrambler 202, concatenated 205 with the scheduling information 203 and sent to a channel encoder 206.

For example, when the CRC is a 16 bits binary signal and the user index is also a 16 bits binary signal, scrambling refers to performing bitwise exclusive OR (XOR) operation on two binary signals. The CRC 201 concatenated with the scheduling information 203 becomes a control channel through the channel encoder 206.

In general, a channel encoder adjusts the length of a coded signal through the code rate, and if b-bit signal is encoded with the code rate 1/3, the length N of the coded signal is 3b bit. As the code rate is lower, N is larger, reliability of the control channel is higher and complexity is greater. This is the basic principle of channel coding.

The basic principle of channel coding refers to a method that maps an arbitrary signal represented by b-bit to hyper-space having a degree of freedom of N that is greater than b and configures such that $2^b$ codepoints are farthest away from one another in the N-dimensional hyper-space.

Accordingly, to acquire b-bit information, a symbol having a size of N is received, and a codepoint closest to the received signal is determined. Accordingly, as N is larger, the distance between codepoints is longer, and thus the detection performance increases and reliability increases, but the dimension of the hyper-space for search is higher and the complexity increases. The present disclosure proposes a control channel transmission method using a sparse coding method in which complexity does not increase with the increasing N.

Figure 3:
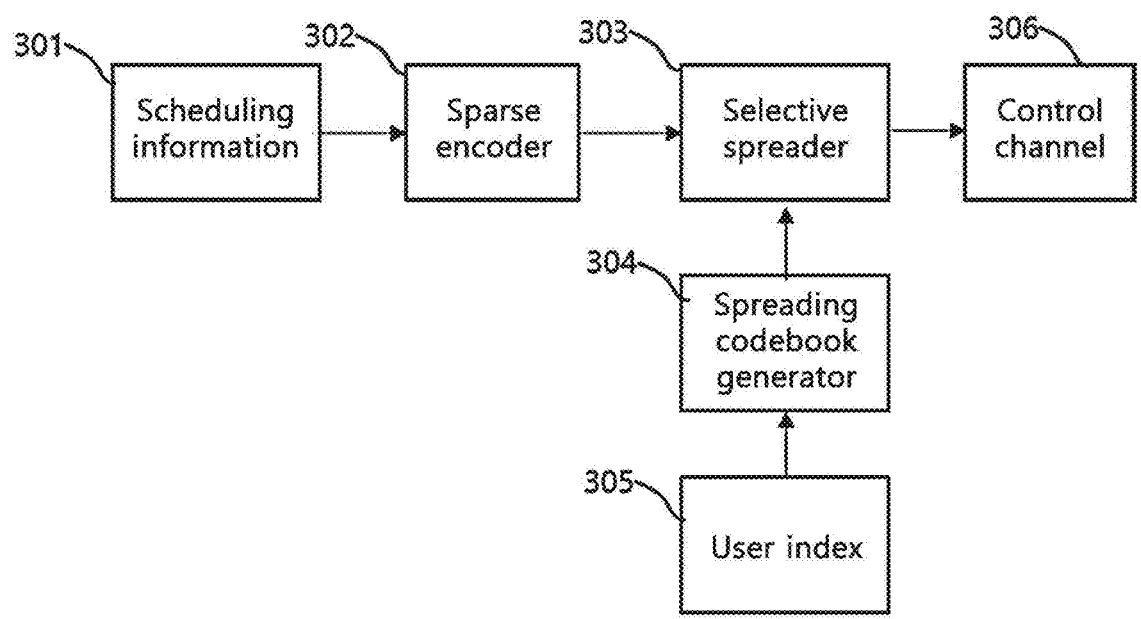
FIG. 3 is a diagram showing a control channel transmission process according to an embodiment of the present disclosure.

FIG. 3 is a diagram showing a control channel transmission process according to an embodiment of the present disclosure. The present disclosure proposes a method that uses the proposed sparse coding scheme for scheduling information 301 through a sparse encoder 302, so that the length of encoded symbol is much longer than the scheduling information (length N), and a non-zero symbol is very small.

In other words, this uses a method that differently selects hyper-space that information corresponding to $2^b$ uses in an N-dimensional hyper-space. As another representation method, this is a method that configures such that codepoints overlap in an N-dimensional hyper-space and selects a largest sum of energy of areas of codepoints, not the distance between codepoints.

After using sparse coding, a spreading codebook that is different for each user is configured through a spreading codebook generator 304 using a user index 305. The spreading codebook has N spreading codes and uses a selective multi-code spreading method that selects one or more spreading codes from the codebook through sparse coding and sends them concurrently to the same resource. It is performed by a selective spreader 303. The spread signal becomes a control channel 306.

Figure 4:
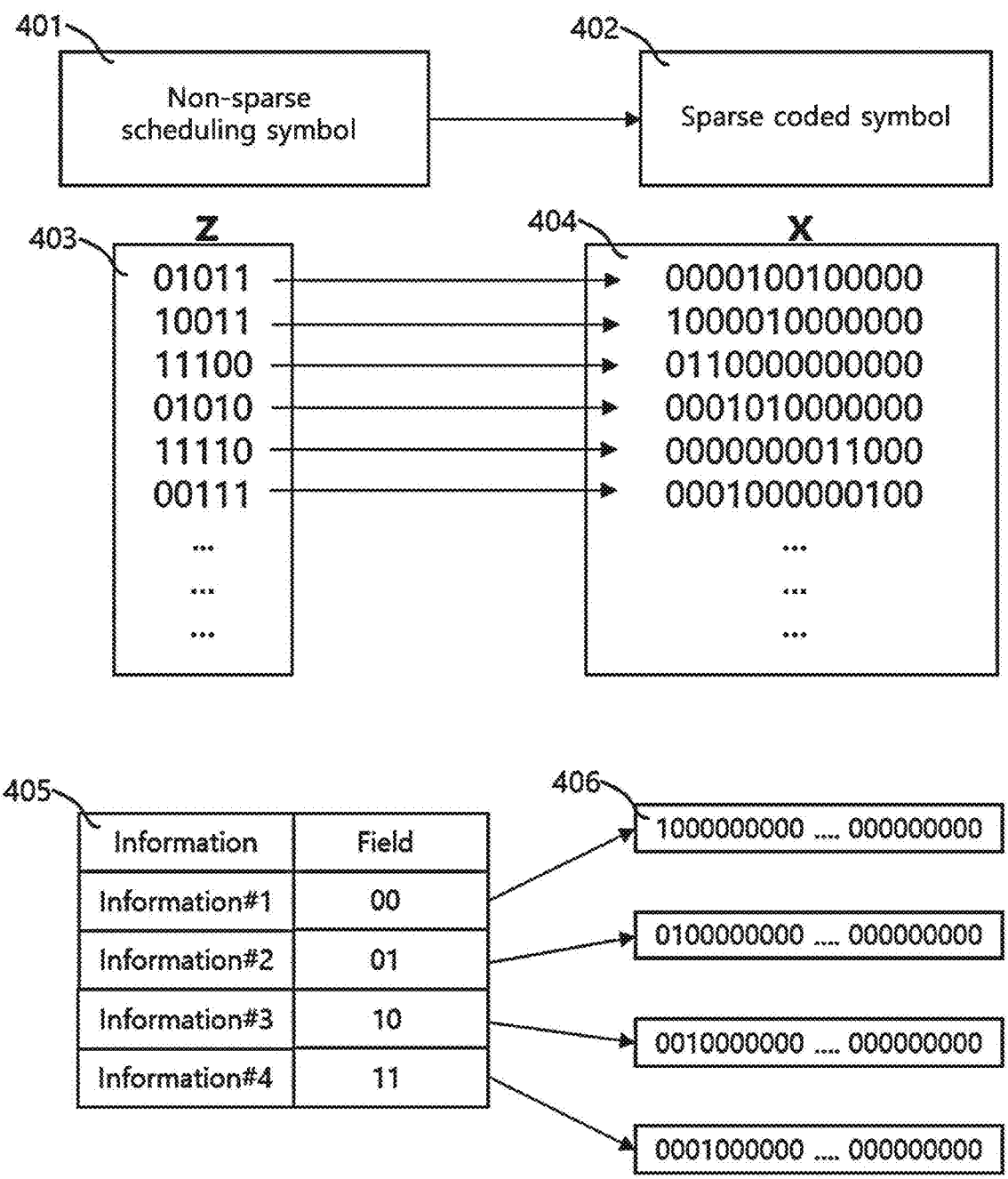
FIG. 4 is a diagram showing a sparse coding method according to an embodiment of the present disclosure.

FIG. 4 is a diagram showing a sparse coding method according to an embodiment of the present disclosure. A method for performing sparse coding is described in detail. The first method is an integer mapping (integer allocation) method. Scheduling information z may be represented by integers, and for example, 00, 01, 10, 11 may be represented as 0, 1, 2, 3. In the case of sparse coding, when N is 4 and the number K of non-zero elements is 2, 0011, 0110, 1001, 1010, 1100 are possible, and may be represented as 3, 6, 9, 10, 12 by integers. Accordingly, sparse coding may be expressed as a process of mapping integers between z and x.

For example, sparse coding is accomplished through integer mapping between z and x, z=0→x=3, z=1→x=6, z=2→x=9, z=4→x=10. The mapping method of sparse coding may use the same mapping between users, but for security, the present disclosure includes using different mappings.

The second method is a structured mapping method. In case in which scheduling information z is, for example, 00, 01, 10, 11, when N is 4 and the number K of non-zero element is 2, 0011
0110
1001
1100

Using the above, the number of zero elements or non-zero elements is equally 2 in columns and rows of one matrix composed of four binary. Using this configuration, they may be represented as 3, 6, 9, 12 by integers.

A difference between the first method and the second method is that the second method has improved decoding performance because sparse configuration of a restorable signal when restoring a sparse signal is specific configuration (the same number of non-zero elements in columns and rows).

The third method is a table mapping method. The table mapping method is a method that maps a field of a scheduling signal z to the position of a non-zero element of an encoded symbol. A table 405 of FIG. 4 configures part of scheduling information as an information name and a bit field. Here, an encoding process is performed so that each field differently configures the position of 1 of an encoded symbol 406. It is a method that configures information through this method.

Through sparse coding, a non-sparse signal is N in length, and is encoded to a sparse signal x in which the number of non-zero elements is K. In the case of K, in the case of transmitting using QPSK symbol, K is configured as 2, and in this instance, the non-zero element uses 1 as one of two values and j as the other. If both use 1, transmission may be performed through BPSK symbol. In the case of using 16 QAM, K=4 and four non-zero elements are set to 1, j, 2, 2j irrespective of the order.

When four non-zero element are all configured as 1, transmission may be performed using 9QAM. In the case of using 64 QAM, K=6, and six non-zero elements are configured as 1, j, 2, 2j, 3, 3j irrespective of the order. When six non-zero elements are all configured as 1, 16 QAM including a zero point may be used.

Figure 5:
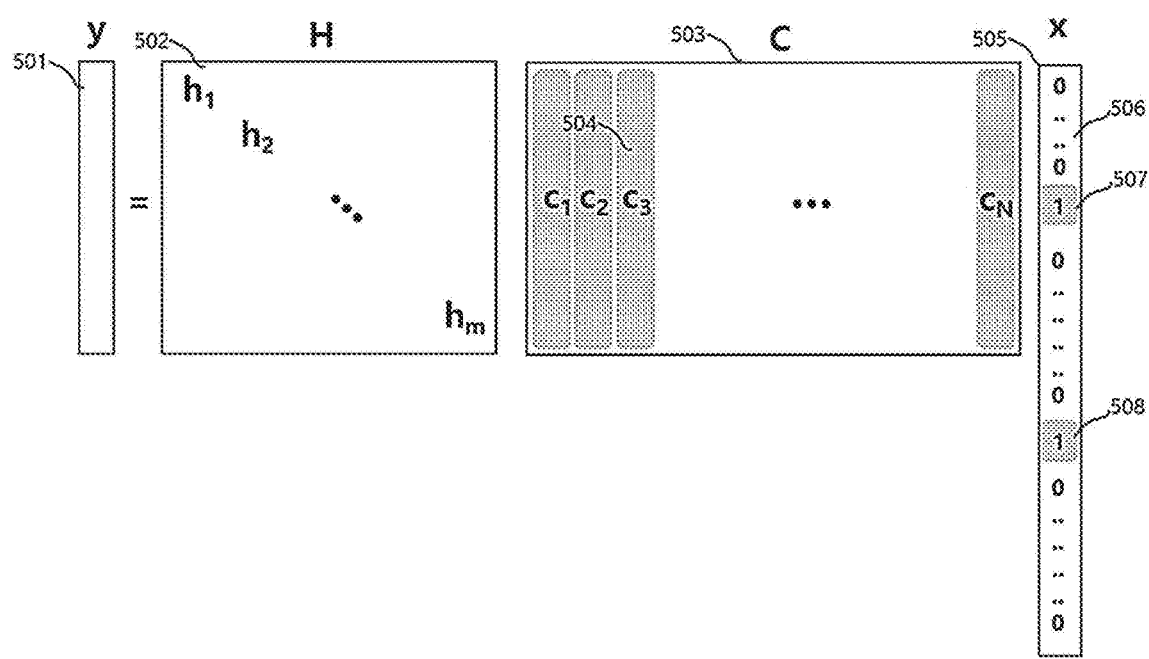
FIG. 5 is a diagram showing a multi-code spreading method according to an embodiment of the present disclosure.

FIG. 5 is a diagram showing a multi-code spreading method according to an embodiment of the present disclosure. When the size of resources of a transmit signal to transmit is m, the length of spreading code is also m, and accordingly, the number of different binary codes that can be made to the length m is $2^m$.

Among them, each user uses N codes, and accordingly, $2^m/N$ users may use different codebooks C. Among the N codes, K codes are actually used in transmission, and this is configured according to the position of the non-zero element selected in the encoding process.

Accordingly, an encoded signal x 505 of FIG. 5 includes zero elements 506 and non-zero elements 507, 508, which is multiplied by a codebook C 503 configured differently for each user, K codes are selected from N codes and the selected codes overlap m resources.

Accordingly, when K is 2, two spreading codes are concurrently transmitted. In this instance, for security, x with varying positions for each user, each time and each transmitted position may be used. When the encoded x is 0110, 1100 may be used at t=1 and 1001 may be used at t=2, and this change may be determined by a preset rule between the transmitter and the receiver.

The codebook C used in the present disclosure may have an orthogonal or non-orthogonal property between each code c. For example, the codebook C has a non-orthogonal property between each code c, but correlation is very low, and thus when different users receive using different codebooks, detection possibility may be very low. The spread signal may be received in the form of y 501 at the receiver through a channel 502.

Figure 6:
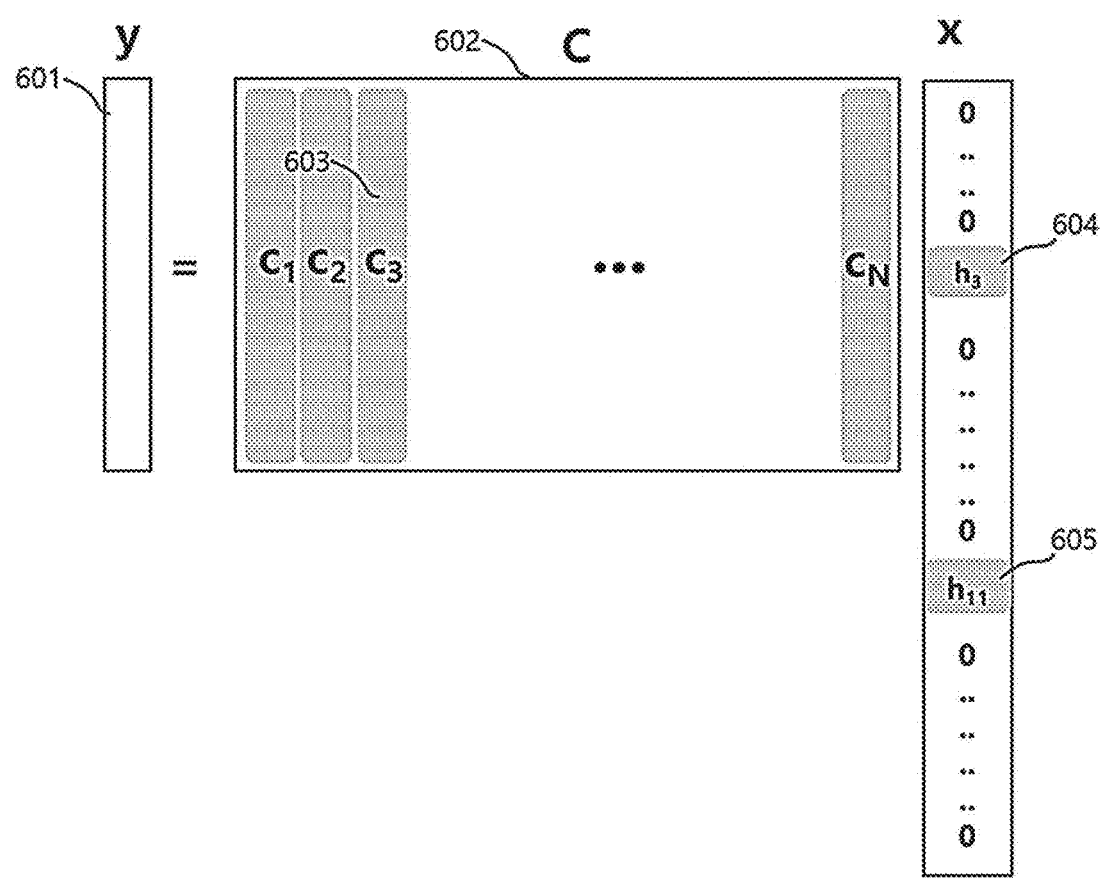
FIG. 6 is a diagram showing a control channel and pilot signal concurrent transmission method according to another embodiment of the present disclosure.

FIG. 6 is a diagram showing a control channel and pilot signal concurrent transmission method according to another embodiment of the present disclosure. FIG. 5 shows a method in which a pilot and a control channel are transmitted to different symbols or resources. FIG. 6 shows a method in which a pilot and a control channel are incorporated into one and transmitted. This method is possible in each case in which a pilot is separately present and a pilot is absent.

When a pilot does not separately exist, a multi-code spread signal is received, and as shown in FIG. 5, the receiver does not determine the position of the non-zero element at x, and determines all the positions and values of the non-zero elements 604, 605 of x, and can acquire both the channel and control channel information.

The reception process of the present disclosure is based on the following table. The following table 1 describes the operation process of the receiver.

TABLE 1

Input:
   Measurement y, sensing matrix Φ, sparsity K, stop threshold ϵ,
   number of expansion L, max number of search candidate $l_{max}$,
   detection threshold ε
Output:
   Support signal $\hat{x}$
Initialization:
   l := 0 (candidate order), ρ := ∞ (min. magnitude of residual)
While: l < $l_{max}$ and ϵ < ρ do
   l := l + 1
   $r^0$ := y
   [$p_1$, . . . , $p_K$] := compute_pk(l, L)    (compute layer order)
   for k = 1 to K do    (investigate l-th candidate)

$\tilde{\pi} := \arg\max_{|\pi|=L} \|(\Phi' r^{k-1})\pi\|_2^2$    (choose L best indices)

$s_l^k := s_l^{k-1} \cup \{\tilde{\pi}_{p_k}\}$    (construct a path in k-th layer)
     $r^k := y - \Phi_{s_l^k} \Phi_{s_l^k}^\dagger y$    (update residual)
     $\bar{x}^k := \Phi_{s_l^k}^\dagger y$
     $\hat{x}^k := Q_s(\bar{x}^k)$    (perform support detection)
   end for
   if $|r^K| < \rho$ then    (update the smallest residual)
     ρ := $|r^K|$
     if $|y| - |r^K| < ε$ then    (user identification)
       $\hat{x}^* := 0$
     end if
     $\hat{x}^* := \hat{x}^K$
   end if
end while
return $\hat{x}^*$
function compute_pk(l, L)
   t := l - 1
   for k = 1 to K do
     $p_k$ := mod (t, L) + 1
     t := floor(t/L)

TABLE 1-continued end for return [p$_1$, ..., p$_K$]
end function

The receiver may identify the position and value of the non-zero element of x from the received signal y using a restorer that restores a sparse signal. Here, the present disclosure describes a process of identifying user information during sparse signal restoration.

When K non-zero elements are detected and then the residual of the signal remaining after detection does not greatly reduce energy of the original signal y, the detected K non-zero elements are determined false detection and ignored. When any non-zero element is not detected during detection, this process determines that it is not a control channel allocated thereto and ignores it.

Figure 7:
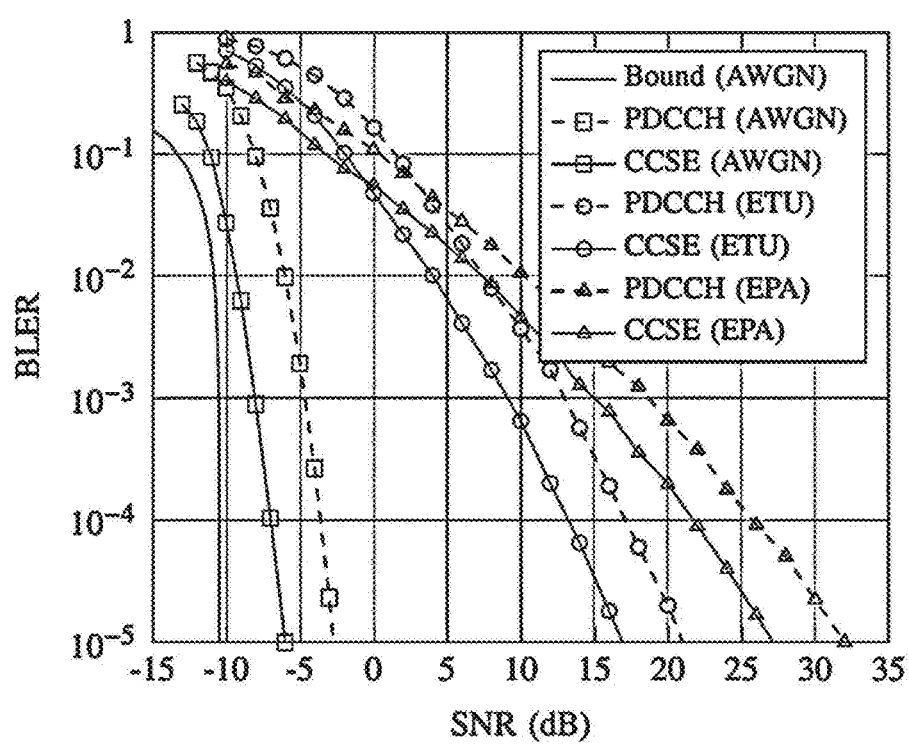
FIG. 7 is a graph for comparison of block error rate (BLER) performance between a control channel according to an embodiment of the present disclosure and a general control channel.

FIG. 7 is a graph for comparison of BLER performance between a control channel by control channel sparse encoding (CCSE) according to an embodiment of the present disclosure and a general control channel such as a physical downlink control channel (PDCCH). Referring to FIG. 7, it can be seen that the proposed technology has 4 dB performance gain in additive white Gaussian noise (AWGN) and various actual channel environments (extended typical urban (ETU) model, extended pedestrian A (EPA) model) compared to earlier technology.

Figure 8A:
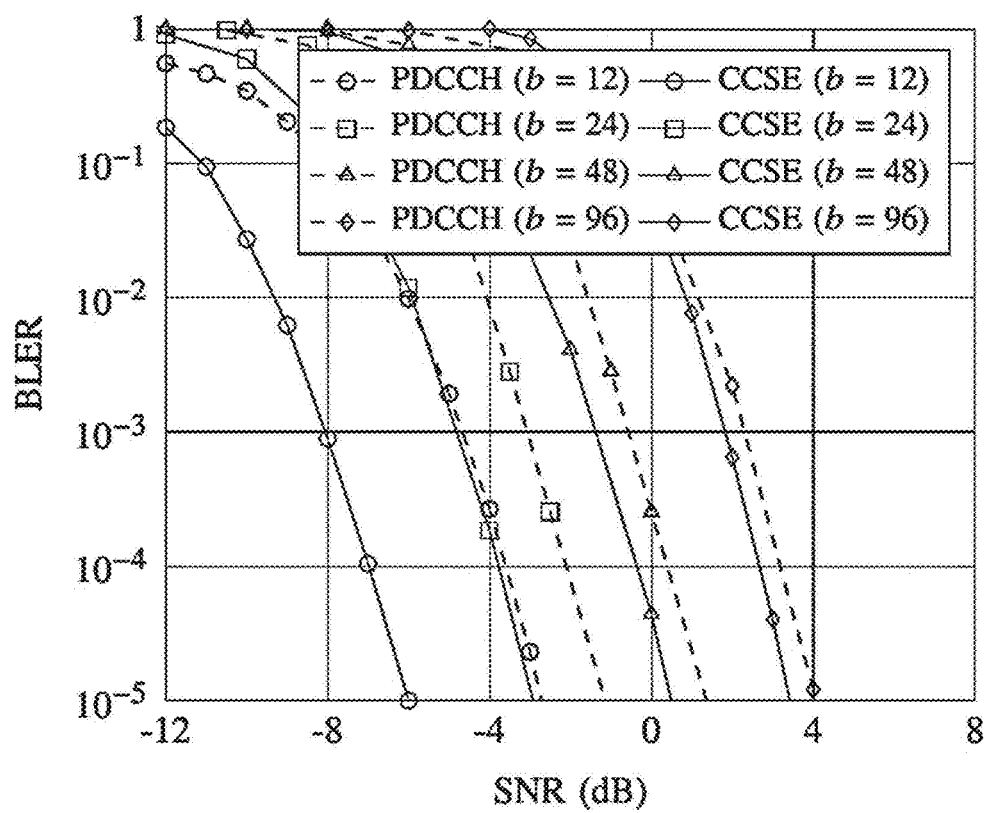
FIG. 8A is a graph for comparison of BLER performance between a control channel according to an embodiment of the present disclosure and a general control channel as a function of an amount of control information.

FIG. 8A is a graph for comparison of BLER performance between a control channel according to an embodiment of the present disclosure and a general control channel as a function of an amount of control information. According to an embodiment of the present disclosure, FIG. 8A shows BLER measurement result when the size b of information changes from 12 bits to 96 bits. Referring to FIG. 8A, it can be seen that the proposed technology has higher gain as the size of information is smaller, and as the size of information increases, a difference in performance of PDCCH using channel coding reduces. This signifies that when the signal to noise ratio (SNR) is small, information that is 2 times or more larger than PDCCH can be transmitted the same resource.

Figure 8B:
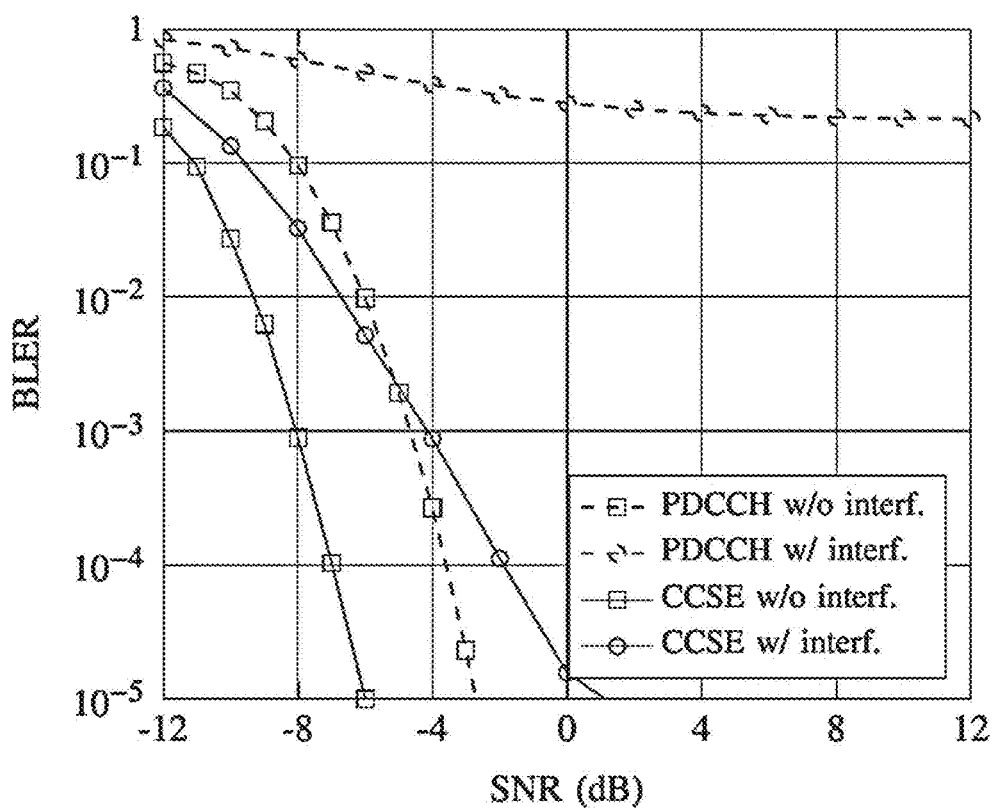
FIG. 8B is a graph for comparison of BLER performance between a control channel according to an embodiment of the present disclosure and a general control channel based on the presence or absence of an interference signal.

FIG. 8B is a graph for comparison of BLER performance between a control channel according to an embodiment of the present disclosure and a general control channel based on the presence or absence of an interference signal. Referring to FIG. 8B, it can be seen that the proposed technology is less affected by interference. This is because of using a spreading code. When interference occurs by a spreading code for other user, earlier technology suffers very severe performance degradation, but the proposed technology provides good performance due to a very small amount of interference remaining after di spreading.

Figure 9:
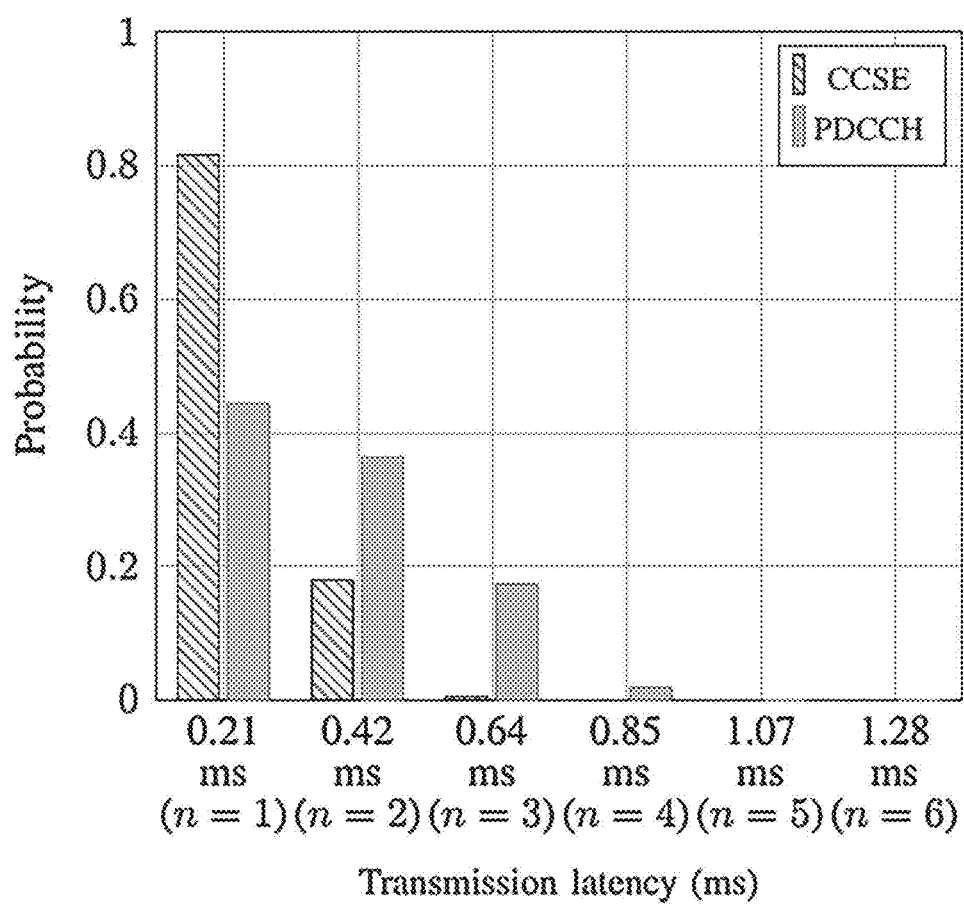
FIG. 9 is a graph for comparison of transmission latency performance between a control channel according to an embodiment of the present disclosure and a general control channel.

FIG. 9 is a graph for comparison of transmission latency performance between a control channel according to an embodiment of the present disclosure and a general control channel. Referring to FIG. 9, because the proposed technology has low BLER performance, transmission failure probability is low, and accordingly, the low transmission error requirement can be satisfied with high probability without re-transmission (n=1). For example, as shown in FIG. 9, it can be seen that the proposed technology satisfies the transmission error requirement of 0.00001 required for URLLC within 0.85 msec. In contrast, it can be seen that earlier transmission methods need 1.28 msec to satisfy the transmission error requirement of 0.00001 under the same condition. That is, it can be seen that transmission by the proposed CCSE has performance gain leading to reduced transmission latency.

Figure 10:
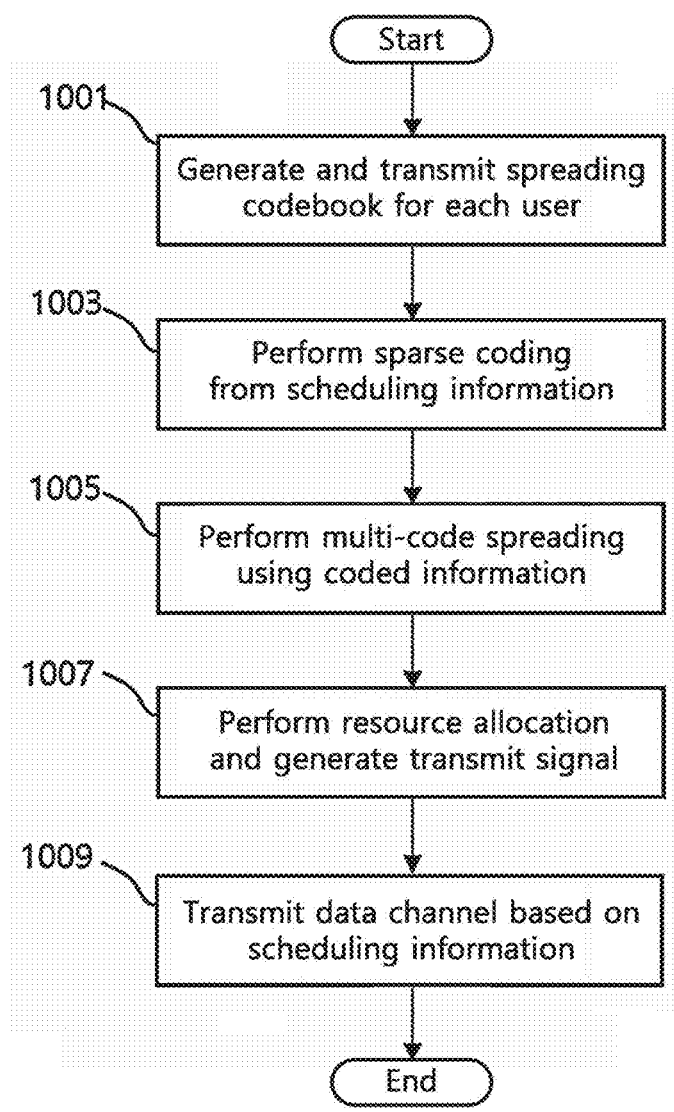
FIG. 10 is a flowchart showing a transmission process according to an embodiment of the present disclosure.

FIG. 10 is a flowchart showing a transmission process according to an embodiment of the present disclosure. First, as in step 1001 of FIG. 10, the base station generates a spreading codebook for each user, and transmits them to each terminal. The transmission process may be pre-recorded in a storage device for each terminal, and may be performed by indication through signaling or transmitting configuration information.

Subsequently, as in step 1003 of FIG. 10, when scheduling information transmission is necessary, a sparse coding process is performed first. Subsequently, as in step 1005 of FIG. 10, multi-code spreading is performed using a coded symbol, and as in step 1007 of FIG. 10, it is allocated to a resource intended to transmit and a transmit signal is generated. That is, a control channel including scheduling information is transmitted. Additionally, a data channel is transmitted based on the scheduling information as in step 1009 of FIG. 10.

Figure 11:
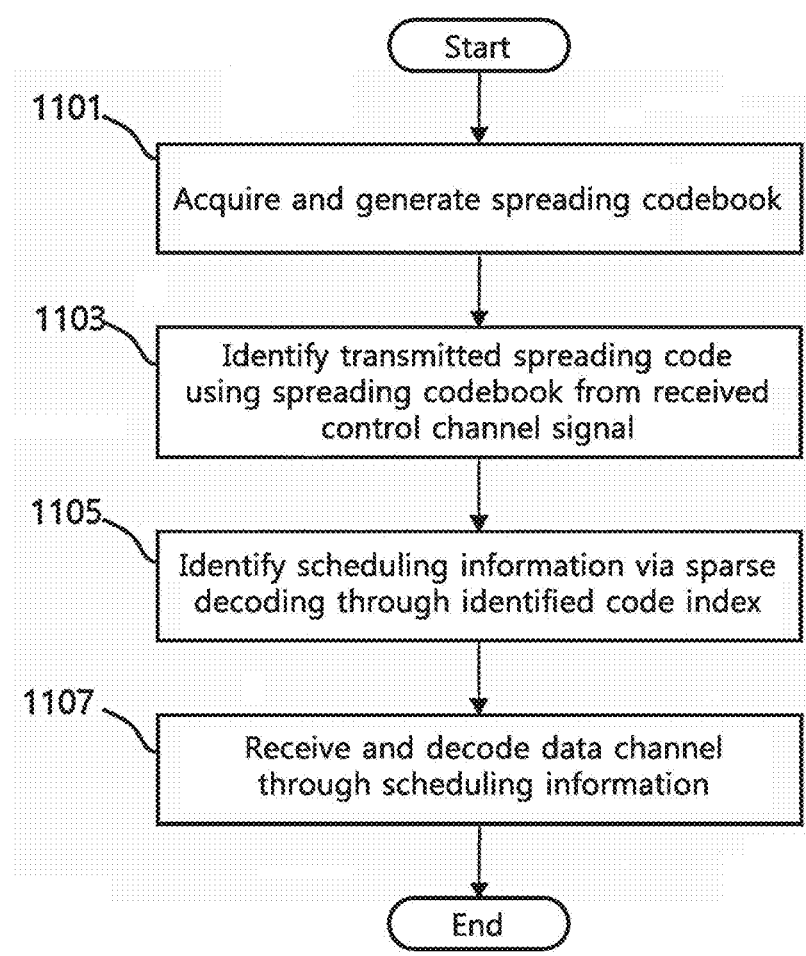
FIG. 11 is a flowchart showing a reception process according to an embodiment of the present disclosure.

FIG. 11 is a flowchart showing a reception process according to an embodiment of the present disclosure. The terminal receives a spreading codebook from the base station, or receives its corresponding information and configures a spreading codebook as in step 1101 of FIG. 11. Subsequently, in the step 1103, a transmitted spreading code is identified from a received control channel signal using the spreading codebook. In this instance, restoration of the transmitted sparse code may be performed through a compressed sensing scheme. The compressed sensing is a scheme that restores a transmitted signal based on a small number of measurements, and for example, a compressed sensing algorithm such as multipath match pursuit with death first (MMP-DF) may be used.

Sparse decoding corresponding to a reverse process of sparse coding is performed using the value or index of the code identified in the step 1105 to identify scheduling information. Subsequently, as in step 1107, a data channel is received by referring to the scheduling information and is decoded.

Figure 12:
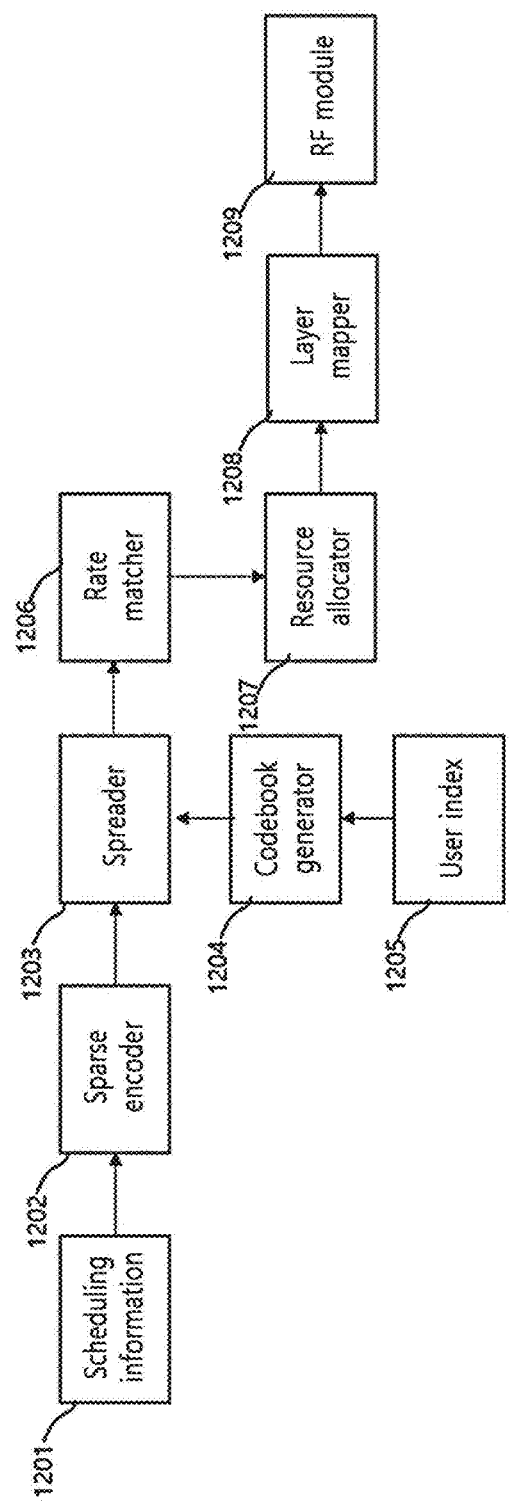
FIG. 12 is a diagram showing an apparatus for transmitting signals according to an embodiment of the present disclosure.

FIG. 12 is a diagram showing an apparatus for transmitting signals according to an embodiment of the present disclosure, showing the signal processing flow together. Scheduling information 1201 of FIG. 12 is converted into a sparse signal through a sparse encoder 1202. Subsequently, it is spread through a spreader 1203 using a spreading codebook, and the spreading codebook is generated from a user index 1205 that is a unique identifier of a user (terminal) using a codebook generator 1204.

Subsequently, the number of control channels is adjusted to fit an amount of resources to transmit through a rate matcher 1206, and it is mapped to time/frequency resources through a resource allocator 1207.

Subsequently, in the case of transmission using at least one antenna, signal processing for multi-antenna transmission is performed through a layer mapper 1208, and it is transmitted to a radio frequency (RF) module 1209 to generate a signal.

For example, the apparatus for transmitting signals may include at least one processor, and the functions of the sparse encoder 1202, the spreader 1203, the codebook generator 1204, the rate matcher 1206 and the resource allocator 1207 may be performed by at least one processor. Additionally, the apparatus for transmitting signals may include a transceiver, and the functions of the layer mapper 1208 and the RF module 1209 may be performed by the transceiver.

Figure 13:
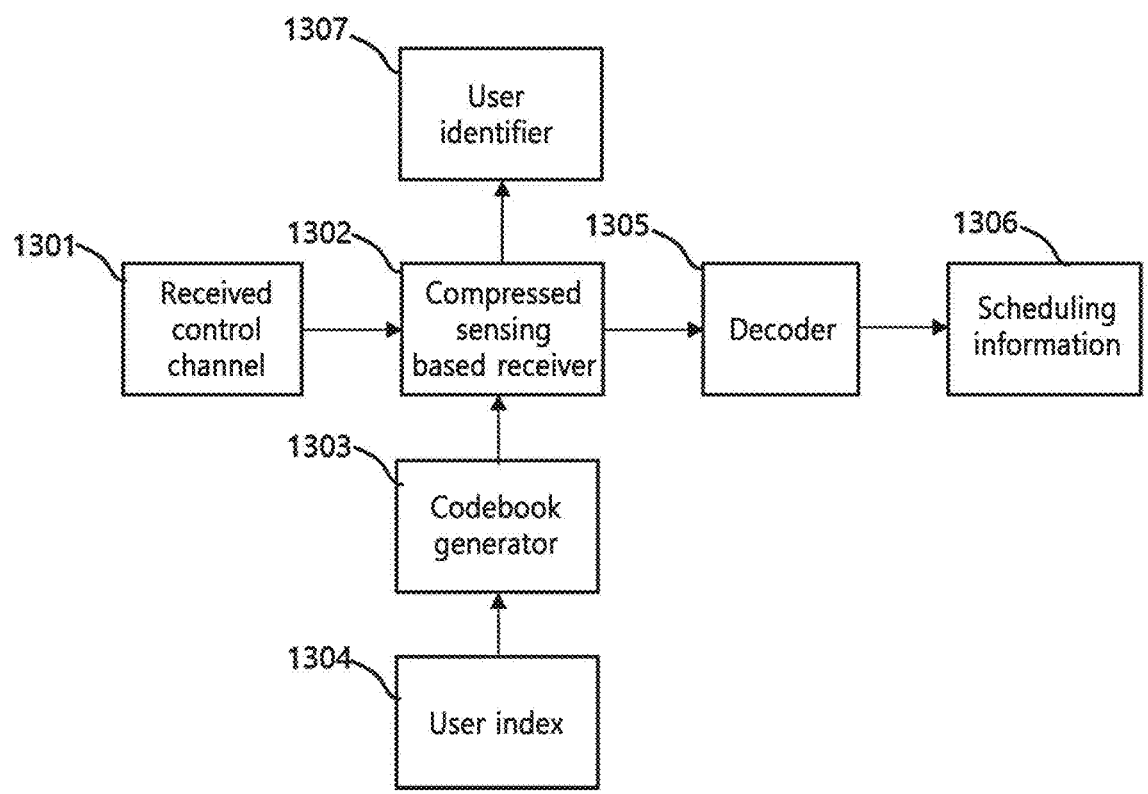
FIG. 13 is a diagram showing an apparatus for receiving signals according to an embodiment of the present disclosure.

FIG. 13 is a diagram showing an apparatus for receiving signals according to an embodiment of the present disclosure, showing the signal processing flow together. Referring to FIG. 13, a terminal receives a control channel 1301 signal through a RF device. A transmitted code is recognized from the received control channel 1301 signal through a proposed compressed sensing based receiver 1302, and this is performed using a codebook generated through a codebook generator 1303 from a user index 1304 that is a unique identifier of the user (terminal). The compressed sensing is a scheme for restoring a transmitted signal based on a small number of measurements, and for example, a compressed sensing algorithm such as MMP-DF may be used. For example, from the code restored through the compressed sensing based receiver 1302 based on the codebook, a user (terminal) identifier 1307 may be identified first, and whether it is control channel information transmitted to the apparatus for receiving signals may be recognized.

Subsequently, a reverse process of sparse coding through the identified information is performed through a decoder 1305, and through this, identified scheduling information 1306 is acquired. The apparatus for receiving signals may receive a data channel from the apparatus for transmitting signals based on the identified scheduling information 1306.

While the present disclosure has been hereinabove described with reference to the embodiments, those skilled in the art will understand that various modifications and change may be made to the present disclosure without departing from the spirit and scope of the present disclosure set forth in the appended claims.

What is claimed is:

1. A method by which a transmitting end operates in a wireless communication system, comprising:
    performing sparse coding on information so as to have sparsity of which a number of non-zero symbols is K;
    configuring a codebook by including a code for spreading for each user;
    spreading the sparse coded information by using one or more codes in the codebook; and transmitting a channel by overlapping the spread sparse coded information,
    wherein the performing sparse coding on the information comprises performing sparse coding by an integer mapping method that carries out one-to-one correspondence between an integer value and the information, wherein the integer value is representable through position information in which a non-zero symbol of a symbol size N and sparsity K is positioned.

2. The method by which a transmitting end operates according to claim 1, wherein the spreading comprises spreading the sparse coded information by using one or more codes having a non-orthogonal property in the codebook.

3. The method by which a transmitting end operates according to claim 1, further comprising:
    allocating a resource according to the information; and
    transmitting a data channel through the allocated resource.

4. A method by which a transmitting end operates in a wireless communication system, comprising:
    performing sparse coding on information so as to have sparsity of which a number of non-zero symbols is K;
    configuring a codebook by including a code for spreading for each user;
    spreading the sparse coded information by using one or more codes in the codebook; and
    transmitting a channel by overlapping the spread sparse coded information,
    wherein the performing sparse coding on the information comprises performing sparse coding by a structured mapping method that configures a same number of non-zero symbols in columns and rows of a matrix corresponding to the information through a symbol size N and sparsity K.

5. A method by which a transmitting end operates in a wireless communication system, comprising:
    performing sparse coding on information so as to have sparsity of which a number of non-zero symbols is K;
    configuring a codebook by including a code for spreading for each user;
    spreading the sparse coded information by using one or more codes in the codebook; and
    transmitting a channel by overlapping the spread sparse coded information,
    wherein the performing sparse coding on the information comprises performing sparse coding by a table mapping method that pre-configures a position of the non-zero symbol according to an information field corresponding to each information.

6. An apparatus for transmitting signals in a wireless communication system, comprising:
    at least one processor which performs sparse coding on information so as to have sparsity of which a number of non-zero symbols is K, configures a codebook by including a code for spreading for each user, and spreads the sparse coded information by using one or more codes in the codebook; and
    a transceiver which transmits a channel by overlapping the spread sparse coded information,
    wherein the at least one processor performs sparse coding by an integer mapping method that carries out one-to-one correspondence between an integer value and the information, wherein an integer value is representable through position information in which a non-zero symbol of a symbol size N and sparsity K is positioned.

7. The apparatus for transmitting signals according to claim 6, wherein the at least one processor spreads the coded information by using one or more codes having a non-orthogonal property in the codebook.

8. The apparatus for transmitting signals according to claim 6, wherein the at least one processor allocates a resource according to the information, and
    the transceiver transmits a data channel through the allocated resource.

9. An apparatus for transmitting signals in a wireless communication system, comprising:
    at least one processor which performs sparse coding on information so as to have sparsity of which a number of non-zero symbols is K, configures a codebook by including a code for spreading for each user, and spreads the sparse coded information by using one or more codes in the codebook; and
    a transceiver which transmits a channel by overlapping the spread sparse coded information,
    wherein the at least one processor performs sparse coding by a structured mapping method that configures a same number of non-zero symbols in columns and rows of a matrix corresponding to the information through a symbol size N and sparsity K.

10. An apparatus for transmitting signals in a wireless communication system, comprising:
    at least one processor which performs sparse coding on information so as to have sparsity of which a number of non-zero symbols is K, configures a codebook by including a code for spreading for each user, and spreads the sparse coded information by using one or more codes in the codebook; and a transceiver which transmits a channel by overlapping the spread sparse coded information, wherein the at least one processor performs sparse coding by a table mapping method that pre-configures a position of the non-zero symbol according to an information field corresponding to each information.

* * * * *